United States Patent [19]

Lowson et al.

[11] 4,077,741
[45] Mar. 7, 1978

[54] HELICOPTER ROTOR BLADES

[75] Inventors: Martin Vincent Lowson, Barton St. David; David Leonard Hawkings; Geoffrey Malcolm Byham, both of Yeovil; Frederick John Perry, Corton Denham, all of England

[73] Assignee: Westland Aircraft Limited, Yeovil, England

[21] Appl. No.: 687,640

[22] Filed: May 18, 1976

[30] Foreign Application Priority Data

May 19, 1975 United Kingdom ............... 21352/75

[51] Int. Cl.² ............................................. B64C 27/46
[52] U.S. Cl. ..................................... 416/228; 416/237
[58] Field of Search ........................ 416/228, 237, 226

[56] References Cited

U.S. PATENT DOCUMENTS

| 1,692,081 | 11/1928 | La Cierva | 416/237 |
| 2,152,861 | 4/1939 | Bennett | 416/226 X |
| 3,066,742 | 12/1962 | Castles | 416/228 |
| 3,399,731 | 9/1968 | Giles | 416/228 |
| 3,467,197 | 9/1969 | Spivey et al. | 416/228 |
| 3,721,507 | 3/1973 | Monteleone | 416/228 X |
| 3,822,105 | 7/1974 | Jepson | 416/228 X |
| 4,012,172 | 3/1977 | Schwaar et al. | 416/228 |

FOREIGN PATENT DOCUMENTS

| 1,566 of | 1926 | Australia | 416/228 |

Primary Examiner—Everette A. Powell, Jr.
Attorney, Agent, or Firm—Larson, Taylor and Hinds

[57] ABSTRACT

A helicopter rotor blade includes a rearwardly swept tip portion having a leading edge of aerofoil profile located forward of the leading edge of a central portion of the blade, and blended with a sharp tip edge of higher sweep magnitude than the leading edge and extending rearwardly to an extreme tip of the blade. A rearwardly swept trailing edge extends from a junction with the trailing edge of the central portion to the extreme tip so that the tip portion has a chord dimension greater than that of the central portion of the blade.

In operation, the rotor blade utilizes a stable vortex dominated flow field created over the tip portion to provide operational advantages in respect of both a retreating and an advancing blade.

18 Claims, 4 Drawing Figures

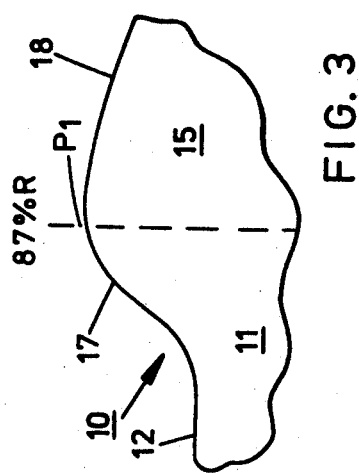
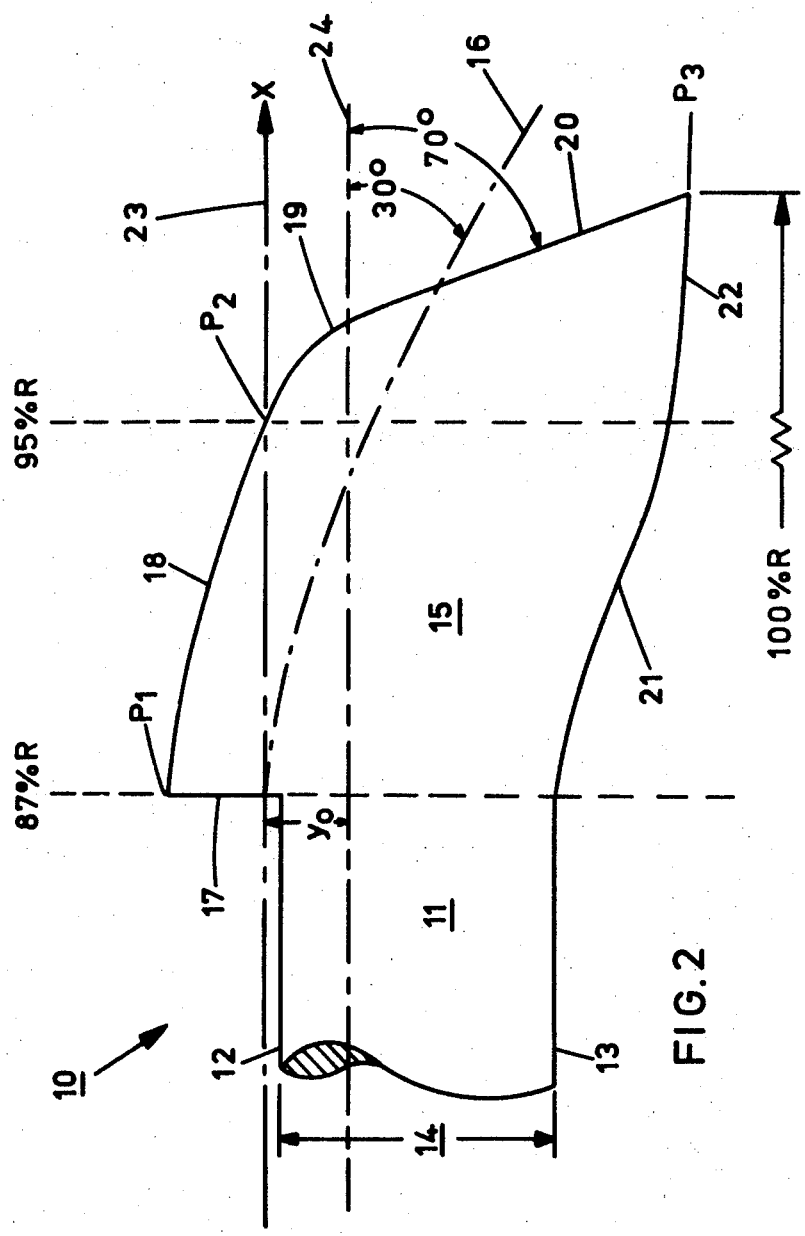

ically 95 per cent of an overall blade radius from
HELICOPTER ROTOR BLADES

FIELD OF THE INVENTION

This invention relates to helicopter rotor blades.

BACKGROUND OF THE INVENTION

Compressibility is a term applied in helicopter aerodynamics to a phenomenon which occurs as an aerofoil approaches the speed of sound. During rotation of the rotor blades of a helicopter this occurs first at the tip area of the advancing blade due to the sum of the tangential velocity of the blade and forward velocity of the helicopter, resulting in high noise levels, a limitation of forward speed due to increased drag, and an increase in vibration and control loads.

Blade vortex interaction is a further undesirable phenomenon affecting the efficiency of helicopter rotor blades. It is caused by a vortex which leaves primarily by the tip area of a preceding blade coming into contact with a following blade. This results in what is known as impulsive loading which causes vibrations, noise, and blade fatigue.

Speed limitation together with other undesirable limitations also result from a blade stall condition which occurs in the retreating blade when relative velocities are low, due to the angle of attack of the blade having to be increased in order to maintain rotor trim.

It is known that a thinned swept tip portion on a helicopter rotor blade will reduce the adverse effects of compressibility on an advancing blade. However, in operation of a helicopter rotor, large blade torsional motions and loads are encountered on the retreating blade when an appreciable spanwise extent of the blade becomes stalled. These loads can result in a limitation of the flight envelope when they exceed the design fatigue capability of the blade or control system, even though the lifting portions of the rotor at the front and rear of the rotor disc quadrants are in fact capable of producing greater lift. The most important region of the retreating blade for producing such violent loads is the blade tip (i.e. approximately the outer 20% of the blade).

Previously, attempts to extend the performance of a helicopter rotor which is limited by a retreating blade stall condition have been concerned with maintaining an attached flow condition over the tip portion of the blade either by improved section lift capability or twist, or combinations of both. However, the thinned section requirements of the advancing blade conflict with these improvements required for the retreating blade, and increased local washout (or twist) to reduce pitch on the retreating blade produces high bending loads on the advancing blade.

SUMMARY OF THE INVENTION

It is an object of the present invention to suppress the onset of tip stall of a retreating helicopter rotor blade to higher angles of attack.

It is a further object of the present invention to achieve the above stated object without compromising the requirements of an advancing helicopter rotor blade.

It is a yet further object of the present invention to achieve the above stated objects whilst also improving the operational characteristics of an advancing blade.

In one aspect the invention provides a helicopter rotor blade comprising a root end arranged for attachment to a rotor head for rotation, during operation, about a generally vertical axis; a central portion extending from the root end, and being of aerofoil section having leading and trailing edges and a chord dimension; and a swept tip at the end of the central portion opposite the root end; the swept tip having a leading edge extending initially forwardly from a junction with the leading edge of the central portion to a first point located forward of the leading edge of the central portion, then being swept rearwardly from the first point to a second point, a rearwardly swept tip edge of higher sweep magnitude than the swept leading edge and extending from the second point to a third point, and a rearwardly swept trailing edge extending from a junction with the trailing edge of the central portion to the third point, the swept tip having a chord dimension longer than the chord dimension of the central portion, an outer area of the tip being progressively reduced in thickness towards the tip edge.

In one form of the invention the forwardly extending part of the leading edge comprises a linear portion extending generally perpendicularly from the leading edge of the central portion to the first point to provide a rapid increase in chord dimension.

In a second form of the invention the forwardly extending part of the leading edge comprises a radiussed portion blended with the leading edge of the central portion and the rearwardly swept leading edge of the tip to provide a smooth increase in chord dimension.

The forwardly extending part may be along a chord located approximately 87 per cent of an overall blade radius from the axis of rotation.

The second point may be along a chord located approximately 95 per cent of an overall blade radius from the axis of rotation.

Preferably, the outer area of the tip is tapered linearly towards the tip edge so that the tip edge is substantially a sharp edge. The taper may commence along a chord located approximately 95 per cent of an overall blade radius from the axis of rotation.

A curved portion may be used to blend the rearwardly swept leading edge with the tip edge, and a transition from an aerofoil shape of the leading edge to the sharp edge of the tip edge may be accomodated in the curved section.

The junction between the rearwardly swept trailing edge of the tip and the trailing edge of the central portion may be positioned on a chord located approximately 87 per cent of an overall blade radius from the axis of rotation.

The swept tip may have an effective sweep angle of approximately 30°, and the swept tip edge may have a sweep angle of approximately 70°.

In a preferred embodiment, the swept leading edge is curved so that an actual sweep angle along the leading edge increases progressively between the first and second points. In such an embodiment, the swept trailing edge comprises inboard and outboard portions, the inboard portion being curved similar to the leading edge and the outboard portion being blended with the inboard portion and extending outwardly to the third point.

Conveniently, the first point may be positioned sufficiently forward of the leading edge of the central portion of the blade so as to permit a blade main structural member to be extended into the swept tip to a position on a chord located approximately 95 per cent of an overall blade radius from the axis of rotation.

In a further aspect, the invention provides a helicopter rotor blade comprising a root end arranged for attachment to a rotor head, a central portion of aerofoil section having leading and trailing edges and a chord dimension, and a rearwardly swept tip, the swept tip comprising, a leading edge having an inboard curved portion of aerofoil profile extending outwardly and rearwardly from a first point located forward of the leading edge of the central portion of the blade to a second point, so as to define a progressively increasing sweep angle between the first and second points, an outboard rearwardly swept portion having a sharp profile and being of higher sweep magnitude than an effective sweep angle of the inboard portion and extending linearly from the vicinity of the second point to a third point forming an extreme tip of the blade, and a central curved portion blending the inboard and outboard leading edge portions in both planform and profile, a rearwardly swept trailing edge having inboard and outboard portions, the inboard trailing edge portion being of similar curved shape to the leading edge inboard portion, and extending from a junction with the trailing edge of the central portion of the blade so as to define, with the forwardly positioned inboard leading edge portion, a chord dimension for the tip longer than the chord dimension of the central portion of the blade, the outboard trailing edge portion being blended with the inboard portion and extending outwardly to terminate at the third point, an outer area of the tip being tapered linearly in thickness towards the sharp edge of the outboard portion of the leading edge.

In a yet further aspect, the invention provides a helicopter rotor blade having a root end arranged for attachment to a rotor head for rotation, during operation, about an axis of rotation, a central portion extending from the root end portion and being of aerofoil section having leading and trailing edges and a chord dimension, and a rearwardly swept tip at the end of the central portion opposite the root end; the swept tip having an effective sweep angle of 30° approximately and a chord dimension longer than the chord dimension of the central portion and comprising, in combination, a swept leading edge positioned forward of the leading edge of the central portion and extending between chords located at 87 per cent and 95 per cent approximately of an overall blade radius from the axis of rotation, the leading edge having a line of curvature arranged so that an actual sweep angle increases progressively between the chords;

a forwardly extending linear portion joining the leading edge of the tip to the leading edge of the central portion along the 87 per cent chord;

a swept trailing edge having inboard and outboard portions, the inboard portion extending from a junction with the trailing edge of the central portion of the blade at a chord located 87 per cent approximately of an overall blade radius from the axis of rotation and having a line of curvature similar to the leading edge, the outboard portion blending with the inboard portion and extending outwardly to an extreme tip of the blade;

a rearwardly swept tip edge having a sweep angle of 70° approximately, and extending linearly between a forward end blended through a curved portion with the leading edge in the vicinity of the 95 per cent chord and a rear end joining the trailing edge at the extreme tip of the blade;

an area of the tip outboard of a chord located at 95 per cent approximately of the overall blade radius being tapered linearly in thickness towards the tip edge so that the tip edge is substantially a sharp edge.

BRIEF DESCRIPTION OF THE DRAWINGS

The invention will now be described by way of example only and with reference to the accompanying drawings, in which:-

FIG. 2 is a planview similar to FIG. 1 showing a preferred embodiment of the invention, and FIG. 3 is a fragmentary view of part of FIG. 2 illustrating a modification.

DETAILED DESCRIPTION OF THE PREFERRED EMBODIMENTS

Figure 1:
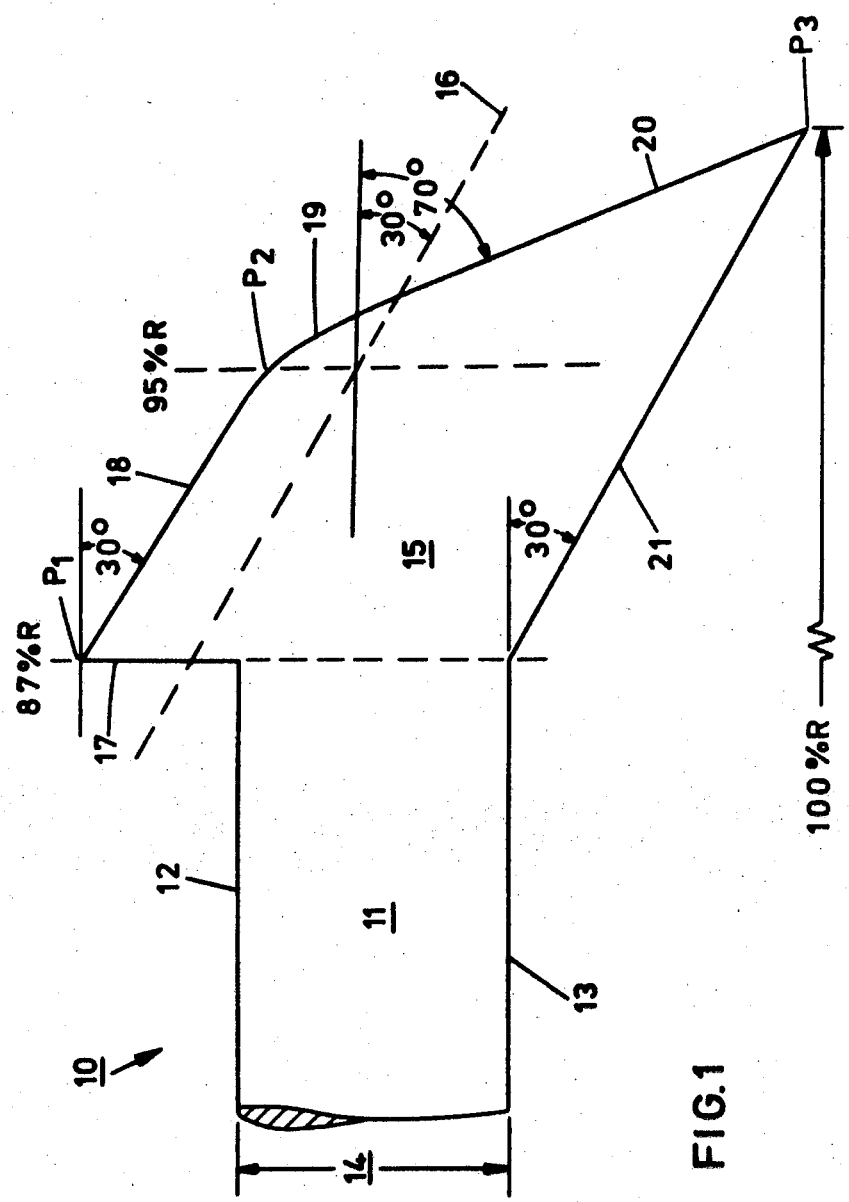
FIG. 1 is a planview of a tip portion of a helicopter rotor blade showing one embodiment of the invention.

In the drawings, a helicopter rotor blade, generally indicated at 10, includes a central portion 11 of aerofoil section having a leading edge 12, a trailing edge 13 and a chord dimension 14. The blade is completed by an inboard root end (as shown in FIG. 4) arranged for attachment to a rotor head, and a rearwardly swept tip 15 that has a longer chord dimension than the chord dimension 14 of the central portion 11.

Figure 4:
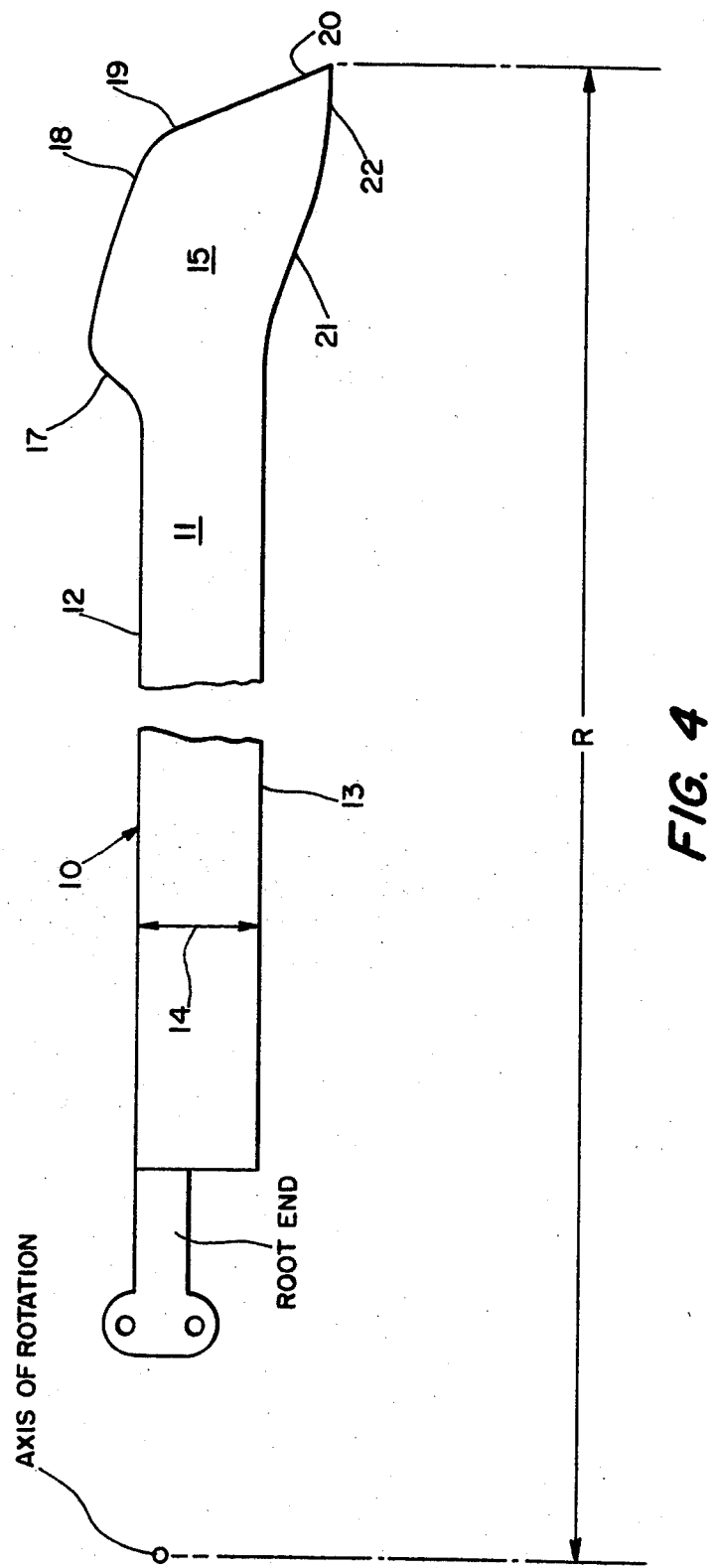
FIG. 4 is a plan view of a helicopter rotor blade showing the embodiment of the invention illustrated in FIG. 2 as modified by FIG. 3.

When mounted on a helicopter, the blade 10 has an operating radius R measured from a generally vertical axis of rotation of the rotor head, to the outermost extremity of the tip 15, as depicted in FIG. 4.

Referring now to the embodiment shown in FIG. 1, the tip 15 is formed with an effective sweep angle of approximately 30° as illustrated by a quarter chordline 16. The swept tip 15 has a leading edge extended initially forwardly from a junction with the leading edge 12 of the central portion 11 by a linear portion 17 located along a chord at approximately 87 per cent of radius R to a first point $P_1$, the portion 17 being arranged perpendicularly with respect to the leading edge 12. From point $P_1$, a leading edge 18 of aerofoil profile is swept rearwardly to a second point $P_2$ located along a chord at approximately 95 per cent of radius R. From point $P_2$ the leading edge 18 is blended by a curved portion 19 with a sharp tip edge 20 swept rearwardly at an angle of 70° to terminate at a third point $P_3$. Point $P_3$ represents the outermost extremity of the blade 10 (100 per cent R), and is located at a position where the tip edge 20 is bisected by a trailing edge 21, which is swept rearwardly at an angle of 30° from a junction with the trailing edge 13 of the central portion 11 located at a position corresponding approximately with 87 per cent of blade radius R.

An area of the swept tip 15 outboard of station 95 percent R approximately, is progressively reduced in thickness and tapers linearly towards the sharp tip edge 20. The transition from the aerofoil shaped leading edge portion 18 to the sharp tip edge 20 takes place throughout the length of the curved portion 19.

FIG. 2 illustrates a preferred embodiment of the present invention.

In FIG. 2 the plan shape of the tip 15 is similar to that shown and described in relation to FIG. 1, except that the swept leading edge 18 extending between points $P_1$ and $P_2$, and an inboard swept trailing edge portion 21 extending from the 87 per cent R station, are formed as smooth curves instead of the straight lines shown in FIG. 1. Additionally, the trailing edge of the tip 15 is completed by an outboard portion 22 blended with the inboard portion 21 and extended outwardly to the third point P₃.

The leading edge 18 is again blended with the sharp tip edge 20 by a curved portion 19, and the tip edge 20 is similarly swept rearwardly at an angle of 70°.

The lines of curvature of the leading edge 18 between points P₁ and P₂ and of the inboard trailing edge portion 21 are defined by an equation for the local quarter chordline 16 of the form:-

$$\frac{y}{r} = \frac{x}{2K}\sqrt{x^2 - K^2} - \frac{K}{2}\mathrm{Logn}\,|x+\sqrt{x^2-K^2}| + \frac{K}{2}\mathrm{Logn}\,|K|$$

in which:
$x = (r/R)$
$K = \cos \Lambda$ tip where $\Lambda$ tip is the tip sweep
$r$ = local radius
$R$ = tip radius
$y$ = local chordwise position.

The equation is used to determine the position of y relative to x on a tip reference axis 23 which is offset by $y_o$ from a quarter chordline 24 of the central portion 11 of the blade. The curved leading and trailing edges are formed by the loci of points ($CN/4$) and ($3CN/4$) ahead and behind of the tip quarter chordline 16 in directions normal to the tip quarter chordline 16, CN being the normal chord length and a constant.

$Y_o$, and by implication, point P₁, may be chosen so that a blade main structural member (not shown) may be extended outwardly to the radius of point P₂ or further, may be chosen to modify the control loads contributed by the lift of the tip 15.

FIG. 3 is a fragmentary view of part of the leading edge of the rotor blade 10 in the region of the 87 per cent radius station and illustrates a modification in which the forwardly extending portion 17 is shaped so as to blend with the leading edge 12 of the central portion 11 and the leading edge 18 of the tip 15. Also refer to FIG. 4 where rotor blade 10 is depicted with the embodiment of the invention shown in FIG. 3.

In FIG. 1, the leading and trailing edges 18 and 21 respectively have generally constant sweep angles corresponding to the tip mean sweep angle determined by operational conditions prevailing at the extreme tip of the blade. However, it is not essential that this degree of sweep should be present at inboard stations since, during operation, the local Mach number is reducing. In the preferred embodiment of FIG. 2, the curved shape of the leading edge 18 and the inboard trailing edge portion 21 respectively, defines a varying sweep angle so that, whilst the effective sweep angle remains at 30°, the actual degree of sweep is increased progressively as the leading edge 18 moves outward between points P₁ and P₂. This also results in a beneficial reduction in the overall rearward position of the trailing edge corner (point P₃), which is enhanced by the outboard trailing edge portion 22 which further reduces the area in this region. Additionally, a reduction of blade tip weight results, due to the reduced rearward offset, and lower levels of stress are achieved in the area of attachment of the tip 15 to the central portion 11 of the blade 10. Improved structural integrity is achieved by positioning the curved leading edge 18 such that a blade main structural member can be extended into the swept tip 15, preferably as far as approximately the 95 per cent radius station.

It will be apparent that, in effect, the tip 15 has a leading edge extending continuously between points P₁ and P₃, and comprising an inboard portion (leading edge 18) having a progressively increasing sweep angle and an aerofoil profile between points P₁ and P₂, a central portion (curved portion 19), and an outboard portion (tip edge 20) having a sharp profile and a higher sweep angle than the inboard portion and extending linearly from the central portion to the third point P₃.

In operation, the blade tip of the present invention improves the operational characteristics of an advancing blade by the incorporation of a tip sweep distribution which builds up progressively as the local free stream Mach number increases along the blade span. The swept trailing edge ensures that high local Mach numbers near the rear of the tip profile are properly suppressed, and the longer chord dimension means that this aerodynamic requirement is achieved without an accompanying movement aft of the centre of gravity and the centre of pressure of the tip 15 as would be the case if the chord dimension of the tip 15 was the same as that of the central portion 11.

The curved portion 19 provides a cut-back at a forward end of the swept tip edge 20, resulting in a desirable isobar distribution in this region. The high angle of sweep of the tip edge 20 and the reduction in thickness from a true section shape to a sharp edge over the outer 5 per cent of the blade span serves to remove excess volume and hence suppresses volume dependent noise from this region of the tip 15.

On a retreating blade, the present blade tip makes use of a vortex dominated flow field at high angles of attack, and therefore no longer relies on maintaining attached potential flow characteristics on the retreating blade.

The sharp tip edge 20 creates a strong leading edge vortex above a critical angle of attack and, as the angle of attack is further increased, the point of origin of the vortex moves progressively forward. On reaching the forward end of the tip edge 20, the vortex continues to move around the leading edge as incidence is increased due to the smooth transition through portion 19 between the tip edge 20 and the leading edge 18. In planform, the leading edge vortex takes up a shape which largely follows, yet falls inside the plan of the tip 15, and trails from the surface slightly inboard of the rear corner of the tip (point P₃).

Flow inboard of the leading edge vortex is regular and essentially streamwise, and does not change considerably as the angle of attack is increased. With the presence of a stable vortex dominated flow, the centre of pressure is moved rearwardly compared with the potential flow position, with the result that an increase in torsional damping is produced beyond that expected from the use of attached flow swept tip aerodynamics. This is an advantage in suppressing torsional oscillations of the blade when inboard areas produce rapid pitching moment inputs.

The forwardly extending portion 17 ensures that an aerodynamic demarkation exists at the junction between the central portion 11 and the tip 15. This demarkation prevents stalled flows from the central portion 11 from spreading to the regular flow in the tip region which would otherwise cause a flow breakdown on the tip, and may be operationally enhanced by suitable shaping of the portion 17 for instance, by forming it as a sharp cambered edge.

In FIG. 2, this demarkation is provided by a rapid increase in the chord dimension in the vicinity of the 87 per cent radius station resulting from the streamwise edge of linear portion 17 so that a discrete vortex is produced which stands above the blade surface and produces an inboard flow at the 87 per cent radius station.

In the modification of FIG. 3, the portion 17 provides a smooth increase in the chord dimension in the vicinity of the 87 per cent radius station, thus producing a spanwise grading in trailing vorticity which suppresses the effective angle of attack over the tip 15.

The inboard spanwise extent of the tip 15 limits the movement of the leading edge vortex and therefore ultimately defines the angle of attack for gross flow breakdown. The spanwise extent of the tip is defined primarily by the magnitude of the sweep used, since on the advancing blade the magnitude of the Mach number benefit attained at the extreme tip determines how much of the blade must be swept in order that inboard stations do not have excessive local Mach numbers. The tip 15 of the present invention employs an effective extreme tip sweep of 30°, which results in a tip 15 extending through approximately 13 per cent of the blade radius.

The forward positioning of the leading edge 18 of the tip 15 serves to provide both the aerodynamic demarkation and also to maintain an acceptable chordwise centre of gravity of the tip 15. Furthermore, the position of the leading edge 18 results in an increase in the local chord dimension of the tip 15 which is also of benefit in increasing tip damping.

By utilising a vortex dominated flow field over the tip 15, the present invention eases a restriction on the thickness to chord ratio which is a characteristic of attached flow arrangements. This means that a thinner section can be used without detriment to the retreating blade performance whilst further improving the advancing blade characteristics by providing a greater increase in advancing blade Mach number limitations than that due to sweep alone.

In addition, the increased tip volume due to the forward positioning of the leading edge 18 can be cancelled by a thinner section being used for the tip 15, so that volume dependent noise can be contained. The volume of the tip 15 is further reduced by the provision of the outboard trailing edge portion 22 which moves point $P_3$ forward in the preferred embodiment (FIG. 2). This has no detrimental effects on the aerodynamics due to the separated vortex flow field employed, and is of further benefit in containing volume dependent noise.

Although various embodiments have been described and illustrated, it will be clear that many modifications may be made without departing from the scope of the invention as defined in the appended claims.

We claim as our invention:-

1. In a helicopter rotor blade comprising a root end arranged for attachment to a rotor head for rotation, during operation, about a generally vertical axis and a central portion extending from the root end, and being of aerofoil section having leading and trailing edges and a chord dimension, the improvement comprising a swept tip at the end of the central portion opposite the root end, the swept tip having a leading edge extending initially forwardly from a junction with the leading edge of the central portion to a first point located forward of the leading edge of the central portion, then being swept rearwardly from the first point to a second point, a curved joining portion blending the swept leading edge with a rearwardly swept tip edge of higher sweep magnitude than the swept leading edge and extending to a third point, and a rearwardly swept trailing edge extending from a junction with the trailing edge of the central portion to the third point, the swept tip having a larger chord dimension than the chord dimension of the central portion, an outer area of the tip being progressively reduced in thickness towards the tip edge.

2. A rotor blade as claimed in claim 1, wherein the forwardly extending part of the leading edge comprises a linear portion extending generally perpendicularly from the leading edge of the central portion of the blade to the first point.

3. A rotor blade as claimed in claim 1, wherein the forwardly extending part of the leading edge comprises a radiussed portion blended with the leading edge of the central portion of the blade and the rearwardly swept leading edge of the tip.

4. A rotor blade as claimed in claim 1, wherein the forwardly extending part is along a chord located approximately 87 per cent of an overall blade radius from the axis of rotation.

5. A rotor blade as claimed in claim 1, wherein the forwardly extending part is formed with a sharp, cambered edge.

6. A rotor blade as claimed in claim 1, wherein the second point is along a chord located approximately 95 per cent of an overall blade radius from the axis of rotation.

7. A rotor blade as claimed in claim 1, wherein the outer area of the tip tapers linearly towards the swept tip edge so that the tip edge is substantially a sharp edge.

8. A rotor blade as claimed in claim 7, wherein the taper commences along a chord located approximately 95 per cent of an overall blade radius from the axis of rotation.

9. A rotor blade as claimed in claim 1, wherein transition from the aerofoil shape of the swept leading edge to the sharp edge of the swept tip edge takes place in the curved portion.

10. A rotor blade as claimed in claim 1, wherein the rearwardly swept trailing edge commences from a junction with the trailing edge of the central portion of the blade at a chord located approximately 87 per cent of an overall blade radius from the axis of rotation.

11. A rotor blade as claimed in claim 1, wherein the tip has an effective sweep angle of approximately 30°.

12. A rotor blade as claimed in claim 11, wherein the sweep angle of the tip edge is approximately 70°.

13. A rotor blade as claimed in claim 1, wherein the swept leading edge is curved so that an actual sweep angle along the leading edge increases progressively between the first and second points.

14. A rotor blade as claimed in claim 13, wherein an inboard portion of the swept trailing edge is curved similarly to the leading edge, the trailing edge being completed by an outboard portion blended with the inboard portion and extending outwardly to the third point.

15. A rotor blade as claimed in claim 1, wherein the first point is positioned sufficiently forward of the leading edge of the central portion of the blade so as to permit a blade main structural member to be extended into the swept tip to a position on a chord located approximately 95 per cent of an overall blade radius from the axis of rotation.

16. A helicopter rotor blade comprising a root end arranged for attachment to a rotor head, a central portion of aerofoil section having leading and trailing edges and a chord dimension, and a rearwardly swept tip comprising a leading edge having an inboard curved portion of aerofoil profile extending outwardly and rearwardly from a first point located forward of the leading edge of the central portion of the blade to a second point so as to define a progressively increasing sweep angle between the first and second points, an outboard rearwardly swept portion having a sharp profile and being of higher sweep magnitude than an effective sweep angle of the inboard portion and extending linearly from the vicinity of the second point to a third point forming an extreme tip of the blade, and a central curved portion blending the inboard and outboard leading edge portions in both planform and profile; and a rearwardly swept trailing edge having inboard and outboard portions, the inboard trailing edge portion being of similar curved shape to the leading edge inboard portion and extending from a junction with the trailing edge of the central portion so as to define with the forwardly positioned inboard leading edge portion, a chord dimension for the tip longer than the chord dimension of the central portion of the rotor blade, the outboard trailing edge portion being blended with the inboard portion and extending outwardly to terminate at the third point, an outer area of the tip being tapered linearly in thickness towards the sharp edge of the outboard portion of the leading edge.

17. A helicopter rotor blade having a root end arranged for attachment to a rotor head for rotation, during operation, about an axis of rotation, a central portion extending from the root end and being of aerofoil section having leading and trailing edges and a chord dimension, and a rearwardly swept tip at the end of the central portion opposite the root end; the swept tip having an effective sweep angle of 30° approximately and a chord dimension longer than the chord dimension of the central portion and comprising, in combination,
    a swept leading edge positioned forward of the leading edge of the central portion and extending between chords located at 87 per cent and 95 per cent approximately of an overall blade radius from the axis of rotation, the leading edge having a line of curvature arranged so that an actual sweep angle increases progressively between the chords;
    a forwardly extending linear portion joining the leading edge of the tip to the leading edge of the central portion along the 87 per cent chord;
    a swept trailing edge having inboard and outboard portions, the inboard portion extending from a junction with the trailing edge of the central portion of the blade at a chord located 87 per cent approximately of an overall blade radius from the axis of rotation and having a line of curvature similar to the leading edge, the outboard portion blending with the inboard portion and extending outwardly to an extreme tip of the blade;
    a rearwardly swept tip edge having a sweep angle of 70° approximately and extending linearly between a forward end blended through a curved portion with the leading edge in the vicinity of the 95 per cent chord and a rear end joining the trailing edge at the extreme tip of the blade;
    an area of the tip outboard of a chord located at 95 per cent approximately of the overall blade radius being tapered linearly in thickness towards the tip edge so that the tip edge is substantially a sharp edge.

18. A helicopter rotor blade having a root end arranged for attachment to a rotor head for rotation, during operation, about an axis of rotation, a central portion extending from the root end and being of aerofoil section having leading and trailing edges and a chord dimension, and a rearwardly swept tip at the end of the central portion opposite the root end; the swept tip having an effective sweep angle of 30° approximately and a chord dimension longer than the chord dimension of the central portion and comprising, in combination,
    a swept leading edge positioned forward of the leading edge of the central portion and extending between chords located at 87 per cent and 95 per cent approximately of an overall blade radius from the axis of rotation, the leading edge having a line of curvature arranged so that an actual sweep angle increases progressively between the chords;
    a curved portion blending the leading edge of the central portion of the blade and the swept leading edge of the tip;
    a swept trailing edge having inboard and outboard portions, the inboard portion extending from a junction with the trailing edge of the central portion of the blade at a chord located 87 per cent approximately of an overall blade radius from the axis of rotation and having a line of curvature similar to the leading edge, the outboard portion blending with the inboard portion and extending outwardly to an extreme tip of the blade;
    a rearwardly swept tip edge having a sweep angle of 70° approximately and extending linearly between a forward end blended through a curved portion with the leading edge in the vicinity of the 95 per cent chord and a rear end joining the trailing edge at the extreme tip of the blade;
    an area of the tip outboard of a chord located at 95 per cent approximately of the overall blade radius being tapered linearly in thickness towards the tip edge so that the tip edge is substantially a sharp edge.

* * * * *